Patented Jan. 12, 1932

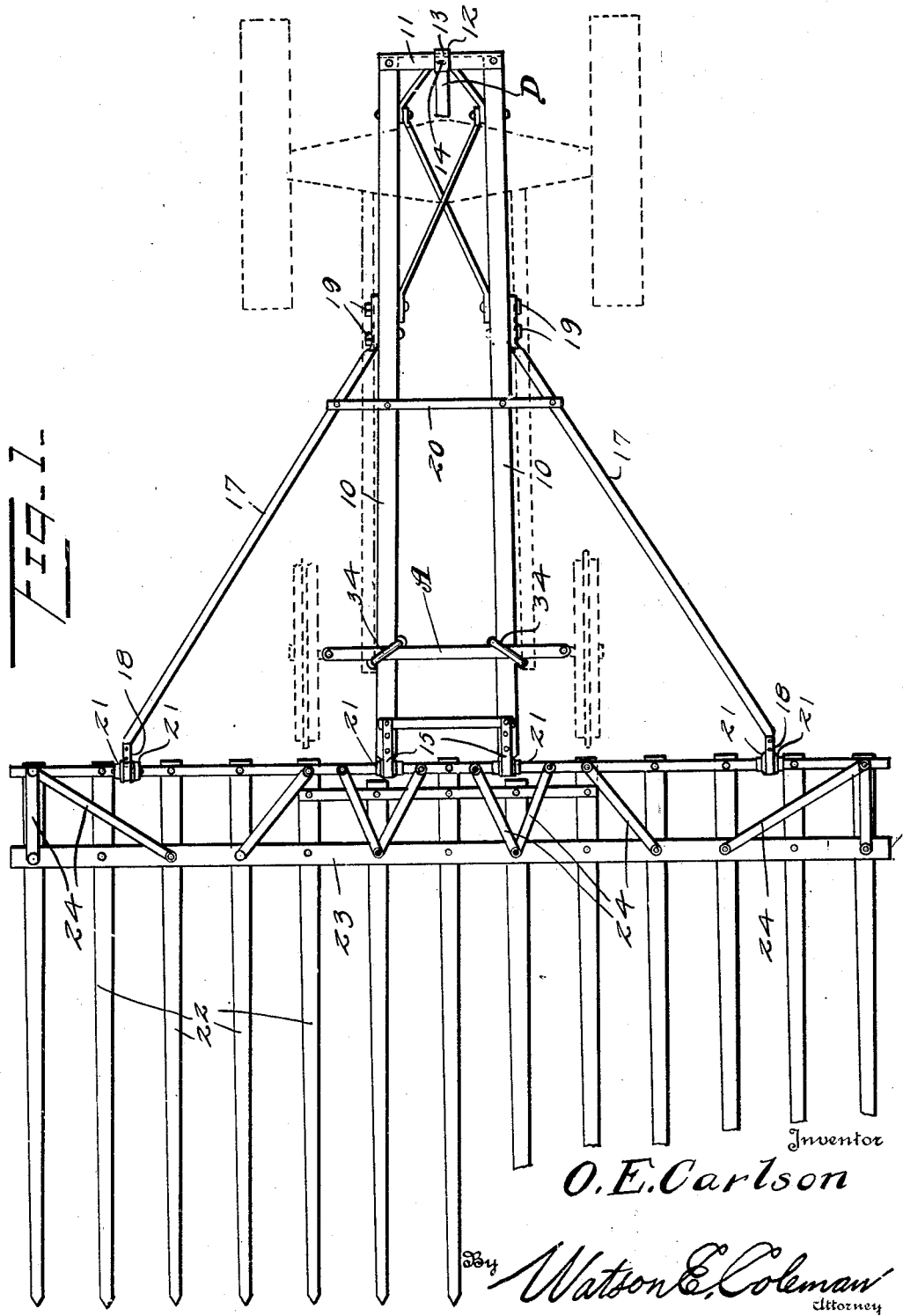

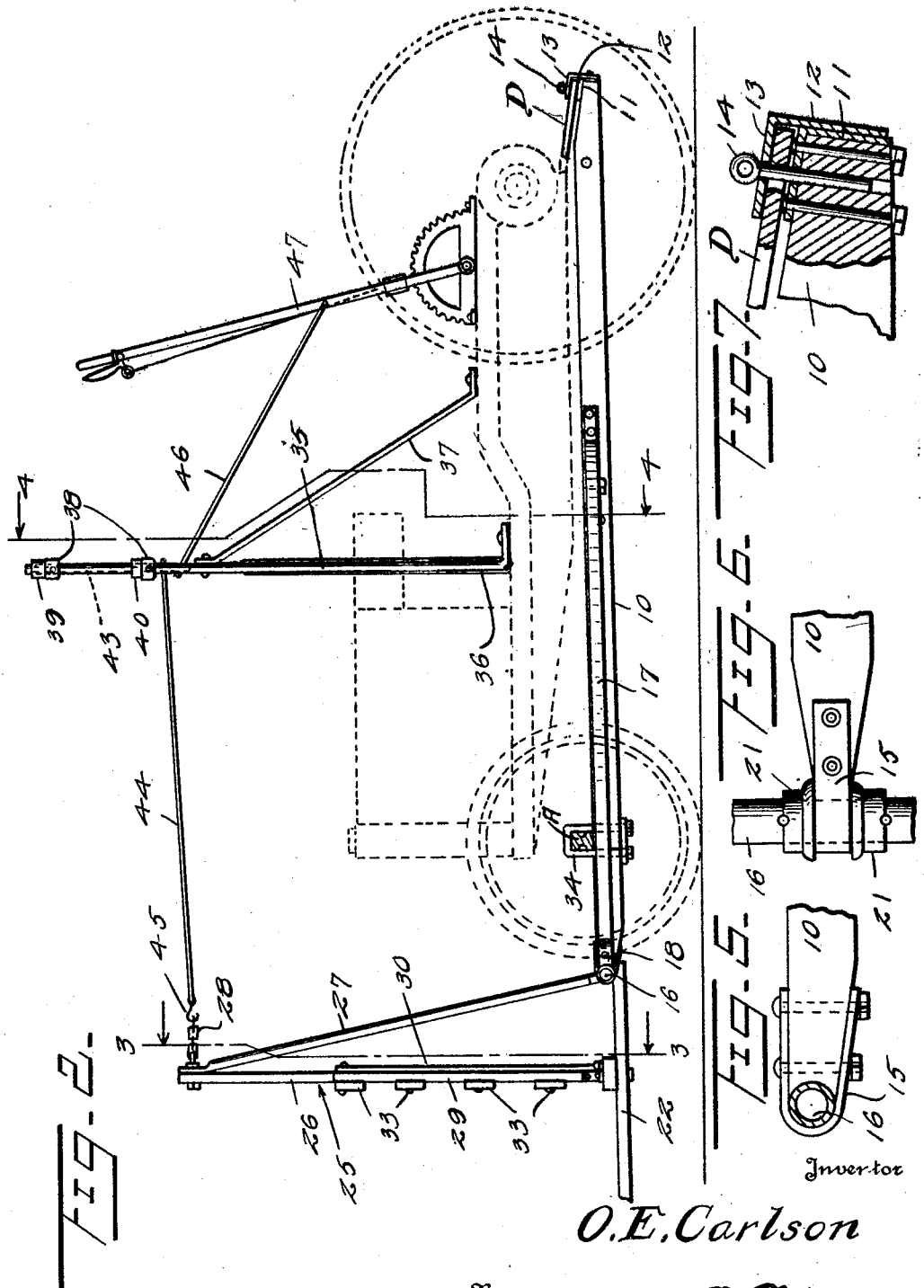

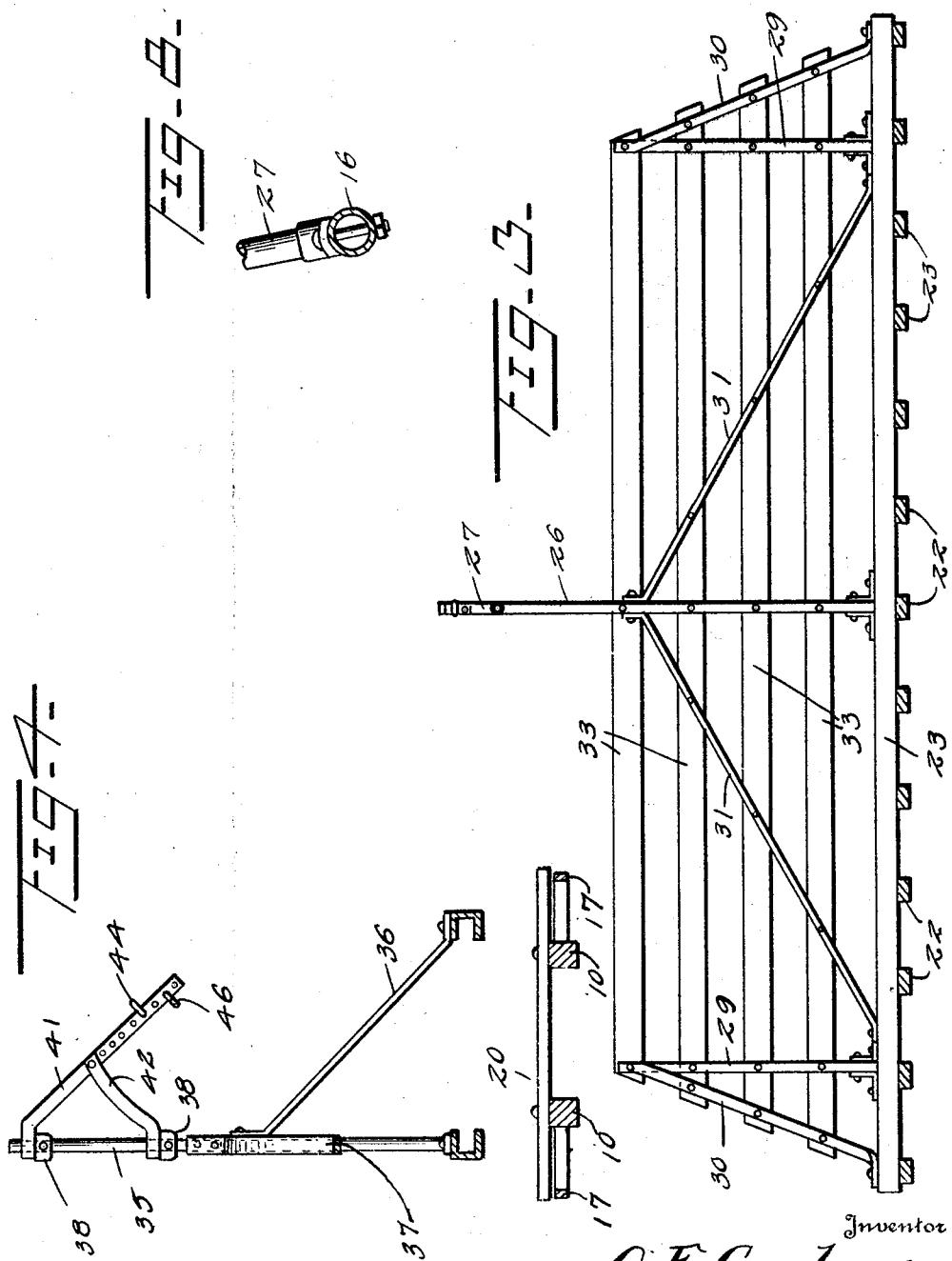

1,841,276

UNITED STATES PATENT OFFICE

OSCAR E. CARLSON, OF NEWMAN GROVE, NEBRASKA

BUCK RAKE OR HAY SWEEP

Application filed September 18, 1928. Serial No. 306,677.

This invention relates to buck rakes or hay sweeps and the like, and more particularly to a device of this character for use in conjunction with a tractor.

An important object of the invention is the provision of a structure such that it may be very readily attached to and detached from the tractor with very little loss of time.

A further object of the invention is to provide a construction permitting the teeth to be raised and lowered and permitting a certain independent movement of the rake teeth with relation to a mechanism by means of which these teeth are raised and lowered, so that the teeth will not be damaged by engagement with the ground.

A still further object of the invention is the provision of a construction such that the device, when applied to the tractor, will be, to a very considerable extent, guided by the tractor, so that the forward ends of the teeth are maintained in proper relation to the ground as the tractor passes over inequalities.

Other objects and advantages will appear in the course of the following description.

My invention is illustrated in the accompanying drawings, wherein:—

Figure 1 is a plan view of a buck rake constructed in accordance with my invention, a tractor being indicated in dotted lines;

Figure 2 is a side elevation in which the tractor is indicated in dotted lines;

Figure 3 is a section on the line 3—3 of Figure 2;

Figure 4 is a section on the line 4—4 of Figure 2;

Figure 5 is a sectional view illustrating the type of mounting employed for the rake;

Figure 6 is a plan view of the rake mounting;

Figure 7 is a sectional view illustrating the manner of connecting the frame to the tractor draw bar;

Figure 8 is a detail sectional view showing a brace mounting.

Referring now more particularly to the drawings, the numeral 10 indicates beams which converge slightly toward their rear ends and are connected at these rear ends by a transverse angle bar 11. The angle bar 11 has secured thereto a strap 12 having an angular flange 13 overlying the upper or horizontal angle of the angle bar. The angle bar and strap are provided with coacting means for the reception of a securing element 14 whereby these ends of the beams may be secured to the draw bar of a tractor. Opposite ends of the beams have bearings or hinge elements 15 rotatably receiving a transverse bar 16 which is circular in cross section and preferably tubular. This bar may be conveniently constructed by employing a length of pipe of the proper size.

The bar 16 is connected adjacent its ends with the beams 10 by angular rearwardly converging braces 17, the forward ends of which are provided with bearings 18 similar to the bearings of the beams 10. Adjacent their rear ends, which are securely bolted to the beams 10 at 19, a transverse brace element 20 is secured to both the beams 10 and the braces 17 to strengthen the structure. The bearings 15 and 18 have associated therewith any suitable means, such as collars 21, for preventing these bearings from moving longitudinally of the bar 16.

Secured to the bar 16 and extending forwardly therefrom are a plurality of rake teeth 22 which, at a point slightly in advance of the bar 16, are connected by a transverse beam 23 paralleling the bar. The beam 23 and bar 16, in addition to being secured to the teeth, are connected to one another by a series of braces 24, so that the tooth structure and the bar 16 and the beam form a solid organization.

Supported from the beam 23 is a back frame structure 25. This back frame structure is preferably constructed by employing a central standard 26, which is rigidly secured at its lower end to the beam 23 and adjacent its upper end is connected to the upper end of a brace 27, the lower end of which is rigidly secured to the bar 16. The upper extremity of the standard has secured thereto a short length of chain 28, the purpose of which will hereinafter appear.

The standard 26 will hereinafter be referred to as the central standard and in addition to this standard, side standards 29 are provided which are of less height than the standard 26 and are secured at their lower ends to the beam. Diagonal braces 30 extend from the upper ends of the standards 29 to the beam and are secured thereto and other braces 31 extend from the lower ends of the standards 29.

These braces 31 are joined and secured to the standard 26 at the approximate level of the upper ends of the standards 29, as indicated at 32. Transversely extending boards 33 secured to the standards 26 and 29 and to the braces 30 and 31 complete the frame structure.

The structure just described is secured to the tractor by extending the beams 10 beneath the front axle of the tractor until their rear ends can be secured to the draw bar D thereof. These beams are then elevated at their forward ends and secured to the front axle A of the tractor by U-bolts 34 or other convenient means. Due to its rugged construction, this may be conveniently accomplished by allowing the device to lay upon the ground and running the front wheels of the tractor over the same until the beams are properly located.

In combination with this structure, I provide a means for oscillating the rake upon the mounting provided by the bearings 15, which include a vertical post 35. This post may be secured at any suitable point but is preferably secured at its lower end to one of the side beams B of the tractor frame and is braced thereto, as indicated at 35 to the other of the tractor frame beams. An additional brace 37 may be extended from the post 35. Upon the upper end of the post, I mount spaced collars 38, which are rotatably engaged by bearings 39 and 40 surrounding the post and rotatable thereon. These bearings are formed one upon the inner end of a lever 41 and the other upon the inner end of a brace 42 for the lever. This lever has secured thereto, by a connection 43 longitudinally of the lever, a rod 44 having at its forward end a hook 45 adapted to interchangeably engage in the links of the chain 28. To the outer ends of the lever is connected one end of a link 46, the opposite end of which is connected to a ratchet adjusting hand lever of any ordinary or usual construction. This hand lever may be conveniently located with respect to the operator of the tractor and is preferably carried directly by the tractor.

It will be obvious that in operation of the device, the lever 47, while providing means determining the limit of approach of the extremities of the rake teeth 22 to the ground, has such connections with these rake teeth that the rake teeth may elevate, slackening the chains 28. This results in a loose mounting for the teeth, preventing breakage thereof due to collection of hay beneath the teeth or casual engagement thereof with the ground. In operation, the device is driven along the wind row until the desired amount of hay is collected when it may be transported to the stack or other point, where it is desired. Reaching the desired point, the hay may be released by lowering the teeth until the hay supported thereby comes into engagement with the ground when the movement of the tractor may be reversed.

Since the construction hereinbefore set forth is capable of a certain range of change and modification without materially departing from the spirit of the invention, I do not limit myself to such specific structure except as hereinafter claimed.

I claim:—

1. A buck rake attachment for tractors comprising a horizontally disposed frame adapted to be secured to the tractor frame, a forwardly projecting rake secured to the horizontal frame, an upstanding back secured to the rake and positioned forwardly of the rear end thereof, an angularly inclined brace secured to the rake and engaging the back, and operating means secured to the tractor and engaging the back structure whereby to swing the rake into or out of engagement with the ground, said operating means comprising a vertically disposed support, means for mounting the support on a tractor frame rearwardly of the rake structure, a swingable arm mounted on the support and extending outwardly therefrom in a substantially horizontal plane, means connecting the arm to the upper portion of the back of the rake, a pivoted operating lever and means connecting the operating lever to the arm whereby to swing the arm coactively with the rocking of the lever, said rake comprising a plurality of spaced parallel tines, a transverse bar secured to the rear end of said tines, a second transverse member secured to said tines forwardly of the rear end thereof, angularly positioned braces secured to each of said transverse members whereby to hold said tines against lateral movement, and a pair of outwardly diverging braces secured to said frame and pivotally engaging said first transverse member.

2. A buck rake attachment for tractors comprising a horizontally disposed frame adapted to be secured to the tractor, a forwardly extending rake body pivotally secured to said frame, braces secured to said frame and pivotally engaging said rake body, a substantially vertically disposed frame secured to said rake body forwardly of the rear end thereof, and operating means secured to the tractor and engaging said vertically disposed frame whereby to swing the rake body in a vertical plane, said operating means comprising a vertically disposed support, means for mounting the support on a tractor frame rearwardly of the rake structure, a swingable arm mounted on the support and extending outwardly therefrom in a substantially horizontal plane, means connecting the arm to the upper portion of the back of the rake, a pivoted operating lever and means connecting the operating lever to the arm whereby to swing the arm coactively with the rocking of the lever, said vertically disposed frame comprising a plurality of spaced parallel bars, a plurality of vertically disposed braces for holding said bars in spaced relation to each other, and a plurality of angularly inclined braces secured to said bars and to said rake body whereby to hold said frame against lateral or longitudinal movement with respect to the rake body, and a plurality of angularly inclined braces secured to said rake body and adapted to hold said body against lateral swinging movement.

In testimony whereof I hereunto affix my signature.

OSCAR E. CARLSON.